(12) United States Patent
Calvert et al.

(10) Patent No.: US 6,540,862 B1
(45) Date of Patent: Apr. 1, 2003

(54) METHOD AND APPARATUS FOR ENHANCING FILM ADHESION WHEN EXTRUDING POLYETHYLENE TEREPHTHALATE ONTO PAPERBOARD

(75) Inventors: Barry Gene Calvert, Covington, VA (US); Leo Thomas Mulcahy, Covington, VA (US); Christopher Jude Parks, Ellicott City, MD (US)

(73) Assignee: MeadWestvaco Corporation, Stamford, CT (US)

( * ) Notice: Subject to any disclaimer, the term of this patent is extended or adjusted under 35 U.S.C. 154(b) by 142 days.

(21) Appl. No.: 09/708,367

(22) Filed: Nov. 8, 2000

Related U.S. Application Data

(63) Continuation-in-part of application No. 09/238,299, filed on Jan. 28, 1999.

(51) Int. Cl.[7] ............................................. B29C 47/00
(52) U.S. Cl. ........................ 156/244.17; 156/244.23; 156/244.24; 156/244.27; 156/322; 162/207
(58) Field of Search ............... 156/244.11, 244.17, 156/244.23, 244.24, 244.27, 322; 162/207

(56) References Cited

U.S. PATENT DOCUMENTS

| | | |
|---|---|---|
| 2,326,926 A | 8/1943 | Bureau et al. |
| 3,371,002 A | 2/1968 | Reddeman |
| 3,402,086 A | 9/1968 | Smith et al. |
| 3,498,865 A | 3/1970 | Paquin et al. |
| 3,904,104 A | 9/1975 | Kane |
| 3,924,013 A | 12/1975 | Kane |
| 3,939,025 A | 2/1976 | Kane |
| 3,967,998 A | 7/1976 | Kane |
| 3,985,604 A | 10/1976 | Balla |
| 3,996,090 A | 12/1976 | Leatherman |
| 4,008,113 A | 2/1977 | Glander et al. |
| 4,150,697 A | 4/1979 | Dowell et al. |
| 4,455,184 A | 6/1984 | Thompson |
| 4,484,971 A | 11/1984 | Wang |
| 4,810,319 A | 3/1989 | Isner |
| 4,818,342 A | 4/1989 | Wagle et al. |
| 4,946,531 A | 8/1990 | Crouch et al. |
| 5,116,444 A | 5/1992 | Fox |
| 5,227,240 A | 7/1993 | Tilley et al. |
| 5,234,516 A | 8/1993 | Okamura et al. |
| 5,676,791 A | 10/1997 | Christel |
| 5,759,329 A | 6/1998 | Krause et al. |
| 5,770,274 A | 6/1998 | Christel |

Primary Examiner—Michael W. Ball
Assistant Examiner—John T. Haran
(74) Attorney, Agent, or Firm—D. L. Bowman

(57) ABSTRACT

This invention relates to the extrusion coating of polyethylene terephthalate (PET) onto paperboard. Such structures of this type, generally, provide an enhanced film adhesion of the PET onto the paperboard, while reducing the coat weights of the PET.

2 Claims, 1 Drawing Sheet

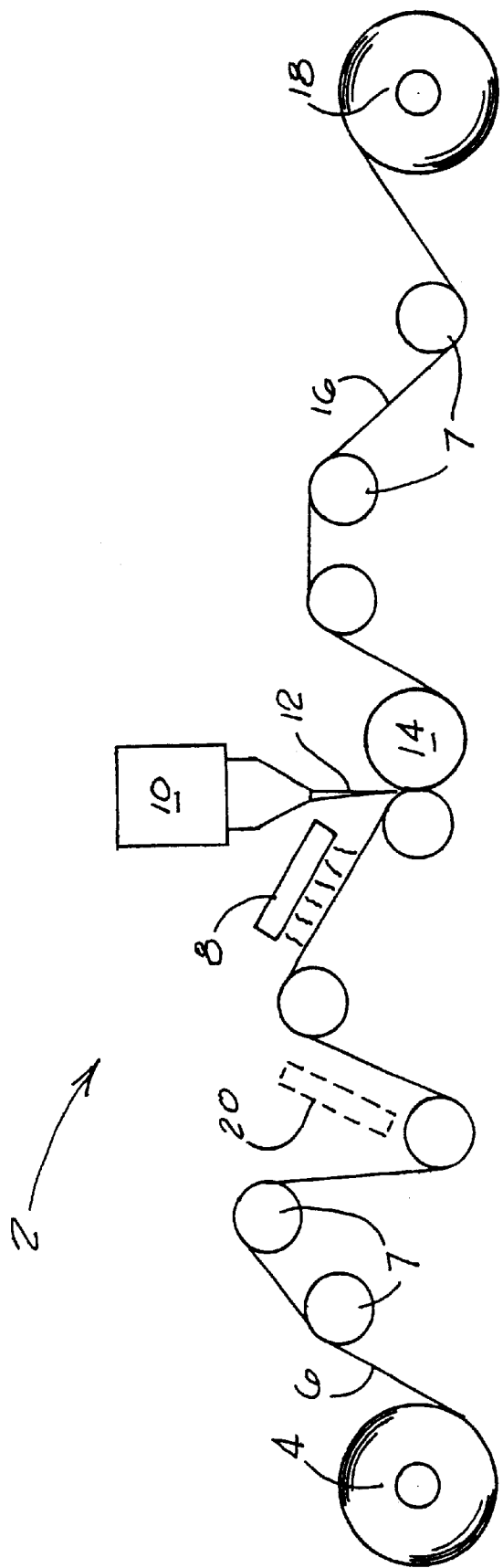
FIGURE

METHOD AND APPARATUS FOR ENHANCING FILM ADHESION WHEN EXTRUDING POLYETHYLENE TEREPHTHALATE ONTO PAPERBOARD

This application is a continuation-in-part of our commonly assigned, co-pending U.S. patent application Ser. No. 09/238,299 filed Jan. 28, 1999, entitled "Method and Apparatus for Enhancing Film Adhesion When Extruding Polyethylene Terephthalate Onto Paperboard".

BACKGROUND OF THE INVENTION

1. Field of the Invention

This invention relates to the extrusion coating of polyethylene terephthalate (PET) onto paperboard. Such structures of this type, generally, provide an enhanced film adhesion of the PET onto the paperboard, while reducing the coat weights of the PET.

2. Description of the Related Art

When paperboard is extrusion coated with a polymer, the film formed during the process must have adequate adhesion to the paperboard substrate in order to withstand subsequent converting and end use requirements. When extrusion coating the polymer, adhesion is the limiting factor as to the coat weight or thickness necessary to provide an acceptable product. If adhesion could be improved at lower weights, the reduction in material to manufacture an acceptable product would be of great value.

Coating the paperboard substrate prior to extrusion with a primer has been attempted. Exemplary of such prior art is U.S. Pat. No. 3,371,002 ('002) to N. G. Reddeman, entitled "Low Temperature Polyolefin Extrusion Coating Process." While the '002 patent describes priming of a paper substrate, drying the substrate in an oven, and corona treating of the extrudate for improving adhesion of the extrudate to the substrate, the drawbacks of this method are mainly three-fold. One, extrusion lines do not have the necessary coating system in-line; therefore, a separate converting step is necessary, which is costly and creates more waste. Secondly, the additional cost of the primer material is not justified by the amount of coat weight reduction which may be achieved. Finally, end use conditions for PET coated paperboard require that the material be able to withstand temperature extremes from −40° F. to 400° F. without delaminating. Typical ethylene-vinyl acetate (EVA) primers cannot withstand these extremes.

It is also known for adhering PET to paper, to heat an uncoated paper surface to at least 285° F. by means of flame or hot gas. Exemplary of such prior art are U.S. Pat. No. 3,904,104 ('104) to W. P. Kane, entitled "Polyethylene Terephthalate/Paperboard Blank and Container Formed From Such Blank," U.S. Pat. No. 3,924,013 ('013) to W. P. Kane, entitled "Method of Cooking Food in a Polyethylene Terephthalate/Paperboard Laminated Container," U.S. Pat. No. 3,939,025 ('025) to W. P. Kane, entitled "Method of Making a Polyethylene Terephthalate Laminate," and U.S. Pat. No. 3,967,998 ('998) to W. P. Kane, entitled "Polyethylene Terephthalate/Paperboard Laminate and Method of Making It, Container Blank Formed From Such Laminate and Container Formed From Such Blank, and Cooking Method Using Such Container." While the '104, '013, '025, and '998 references teach the use of heating an uncoated paper surface, the paper must be in the pH range of 7–7.5 and the intrinsic viscosity of the PET must be in a range of 0.51–0.85. Also, it must be pointed out that no coat weights are given in these references. Therefore, a more advantageous coating method would be presented if the paper surface could be heated without flame or hot gas and employ reduced coat weights.

Finally, it is known to heat the extrudate. Exemplary of such prior art are U.S. Pat. No. 5,770,274 ('274) to A. Christel, entitled "Method for Producing Extrusion-Coated Laminates," and U.S. Pat. No. 5,676,791 ('791) to A. Christel, entitled "Device for Producing Extrusion-Coated Laminates." While the '791 and '274 references teach the heat treating of the extrudate, this is done in order to improve adhesion of the extrudate to the substrate. Conversely, a more advantageous system would be presented if the substrate were heated.

It is apparent from the above that there exists a need in the art for a system which extrusion coats polyethylene terephthalate onto paperboard, and which at least equals the film adhesion characteristics of the known coating systems, but which at the same time substantially reduces the amount of PET being coated onto the paperboard. It is a purpose of this invention to fulfill this and other needs in the art in a manner more apparent to the skilled artisan once given the following disclosure.

SUMMARY OF THE INVENTION

The invention provides a method for coating an uncoated paperboard web with polyethylene terephthalate. The uncoated paperboard web is heated by infrared radiation to a temperature in the range of about 190 F. to about 260 F. Polyethylene terephthalate is extruded directly onto the heated uncoated paperboard web at a coat weight in the range between about 16 lbs./3000 ft$^2$ and about 20 lbs./3000 ft$^2$. The coated paperboard web is then surface treated.

It is preferred that the paperboard web be heated to a temperature in the range of about 140° F. to about 255° F., with the more preferred range being from about 210° F. to about 250° F.

It is also preferred that the extrudate has a coat weight of less than 20 lbs. per 3000 sq. ft., with a further preferred range being less than about 18 lbs. per 3000 sq. ft., and the most preferred range being less than about 16 lbs. per 3000 sq. ft.

In certain preferred embodiments, the coated paperboard web is brought into contact with a chill roll.

The preferred coating system, according to this invention, offers the following advantages: ease of assembly and repair; good stability; excellent durability; excellent economy; reduced coat weight and excellent adhesion. In fact, in many of the preferred embodiments, these factors of durability, economy, reduced coat weight, and adhesion are optimized to the extent that is considerably higher than heretofore achieved in prior, known coating systems.

BRIEF DESCRIPTION OF THE DRAWING

The above and other features of the present invention, which will become more apparent as the description proceeds, are best understood by considering the following detailed description, in conjunction with the accompanying drawing, in which the single FIGURE is a schematic illustration of a coating system for enhancing the film adhesion of polyethylene terephthalate on paperboard, according to the present invention.

DETAILED DESCRIPTION OF THE INVENTION

With reference first to the FIGURE, there is illustrated an advantageous environment for use of the concepts of this invention. In particular, coating system 2 is illustrated. System 2 includes, in part, unwind paperboard roll 4, paperboard web 6, conventional rollers 7, heater 8, conventional polyethylene terephthalate (PET) extruder 10, PET extrudate 12, conventional chill roll 14, coated paperboard web 16, takeup paperboard reel 18, and optional heater 20.

Heater 8, preferably, is any suitable infra-red (IR) heater which is capable of heating paperboard web 6 with an output of greater than 0.02K Joules/ft$^2$. Heater 8 can also be located in location 20 depending upon the desired adhesion characteristics of extrudate 12.

To prove the efficacy of the present invention, the following examples and test results are provided. In order to reduce cost, it is desirable to reduce the coat weight of polyethylene terephthalate (PET) applied to ovenable paperboard. Under normal operating conditions, adhesion of PET to paperboard is inadequate below a coat weight of about 19 lbs./3000 sq. ft. It is thought that a thinner polymer curtain cools and solidifies faster, resulting in less time available for adhesion between the paperboard and polymer to be achieved. As discussed earlier, recent work has looked at chemical primers and ozone for improving adhesion at lower coat weights. However, primers resulted in fiber-tearing adhesion at coat weights as low as 11 lbs./3000 sq. ft., while ozone had no beneficial effect on adhesion. While primers will reduce the cost of the polymer used, there will be a cost associated with the primer itself, as well as with the operation of the primer station.

The following examples are provided to further illustrate the present invention and are not to be construed as limiting the invention in any manner.

In the examples described herein, the effect of preheating the paperboard web as it enters the extrusion-coating nip was investigated. A portable test unit from Impact Systems of Los Gatos, Calif. was used to accomplish the heating. It was hoped that this would reduce the rate at which the polymer cools, keeping the polymer in a molten state for a longer time, therefore allowing adhesion to be achieved at lower coat weights.

An infra-red heater was mounted over one side of the web ahead of the extrusion nip in the configuration shown in the FIGURE. The extruded reel was slit into four narrow rolls for converting. The heater was aligned such that it was over one of the four rolls. This roll and a control roll from the opposite side of the machine were kept for testing.

The power to the infra-red heater was variable and experiments were run at 0.04 KJ/ft$^2$. The temperature measured on the web ahead of the nip as a function of power input to the heater is shown in Table 1 below.

TABLE 1

| Web Temperature as a Function of Power | |
|---|---|
| Power (KJ/ft$^2$) | Web Temperature |
| 0.00 | 135° F. |
| 0.04 | 215° F. |

A series of coat weights was run by varying the extruder screw speed. That is, the extrusion coating line speed was kept constant and the extruder screw speed was varied in order to evaluate a series of coat weights with and without infrared heating of the web prior to the extruder nip. Coat weights as a function of extruder speed are shown in Table 2. The coat weight from the corresponding section of the control roll are also shown (i.e., conditions 1–4). Unfortunately, because of variation across the web, the coat weights from the two rolls do not match. However, there is a range of coat weights such that a fair comparison is possible.

The minimum coat weight achieved was about 16 lbs./3000 sq. ft. or about a twenty-five percent (25%) reduction from a standard coat weight of 21 lbs. The minimum coat weight on the control side of the reel was as low as 13 lbs. However, there are conditions near 16 lbs. for comparison with the heated samples.

In evaluating adhesion, all of the samples on the heated side of the roll had some degree of fiber tearing adhesion when tested on a conventional slip/peel tester. Samples from the control side of the roll generally peeled cleanly, and the peel force was measured. Samples were tested in the machine (MD) and cross (CD) directions, and the results are tabulated in Table 2 below.

TABLE 2

Adhesion as a Function of Coat Weight With and Without Infrared Preheating

| Condition | Heater | Extruder Speed (RPM) | Web Temp. (° F.) | Coat Weight[1] (lbs./3000 ft$^2$) | Machine Direction Adhesion[2] | Cross Direction Adhesion[2] |
|---|---|---|---|---|---|---|
| 1 | no | 208 | 135 | 18.3 | 2/9 | 3/9 |
| 2 | no | 188 | 135 | 15.5 | 4/9 | 0/9 |
| 3 | no | 168 | 135 | 13.1 | 1/9 | 6/9 |
| 4 | no | 158 | 135 | 13.2 | 0/9 | 1/9 |
| 5 | yes | 208 | 215 | 20.7 | 8/9 | 9/9 |
| 6 | yes | 188 | 215 | 19.4 | 9/9 | 9/9 |
| 7 | yes | 168 | 215 | 16.6 | 9/9 | 9/9 |
| 8 | yes | 158 | 215 | 16.1 | 8/9 | 9/9 |

[1]Coat weight was varied by changing screw speed.
[2]Number of fiber tears out of 9 samples.

At equal coat weight, samples without infrared preheating had less adhesion than samples with infrared preheating. Sample 1 without infrared preheating, had higher coat weight and less fiber tear than samples 7 and 8 with infrared preheating. Paperboard from condition 8 was converted into ovenable trays and tested in conventional and microwave cooking. Performance was equal to that of cartons with standard coat weight and no preheating.

A series of coat weights was run wherein the extruder screw speed was kept constant and the extrusion coating line speed was varied in order to evaluate a series of coat weights with and without infrared heating of the web prior to the extruder nip. The results are shown in Table 3 below.

TABLE 3

Adhesion as a Function of Coat Weight With and Without Infrared Preheating

| Condition | Heater | Line Speed (fpm) | Web Temperature (° F.) | Coat Weight (lbs./ 3000 ft²) | MD[1] Adhesion peak (g/in) | MD[1] Adhesion avg. (g/in) |
|---|---|---|---|---|---|---|
| 1 | no | 685 | 120 | 21.2 | 117 | 97 |
| 2 | no | 806 | 120 | 17.6 | 48 | 40 |
| 3 | no | 980 | 120 | 15.0 | 28 | 19 |
| 4 | yes | 685 | 220 | 22.1 | 339 | 204 |
| 5 | yes | 806 | 200 | 19.8 | 343 | 220 |
| 6 | yes | 980 | 190 | 15.9 | 120 | 82 |

[1]Machine Direction peel force in grams/inch.

As can be seen from the results in Table 3, the peak peel forces are higher when the infra-red heater is used to preheat the web, indicating that web preheating improves adhesion. Interpolating from these results, a coat weight of 16 lbs./ 3000 ft² produced with the infra-red heater gave the same adhesion as a coat weight of 21 lbs./3000 ft² produced without the infra-red heater.

In a third experiment, adhesion at fifteen locations (every inch) was measured with and without infrared heating. Peak and average peel forces as a function of position for the heated and unheated samples are presented in Graphs 1(a) and 1(b). The peak and average peel forces were higher for the samples produced with web preheating than for the samples produced without web preheating. On average, the peak peel force was 426±77 g/in higher and average peel force was 329±88 g/in higher for the heated sample than for the unheated sample. It must be noted that the worst adhesion on the heated sample was greater than the best adhesion on the unheated sample. In this comparison, the unheated sample with the best adhesion had a coat weight that was 2 lbs./3000 ft² greater than the coat weight of the heated sample with the worst adhesion. These results suggest that, at a minimum, web preheating will allow for a savings of at least 2 lbs./3000 ft² while maintaining the same adhesion level.

Graph 1(a)

Peak Machine Direction Peel Force Across the Zone Covered By the Heater for Samples Produced with and without Infra-Red Preheating

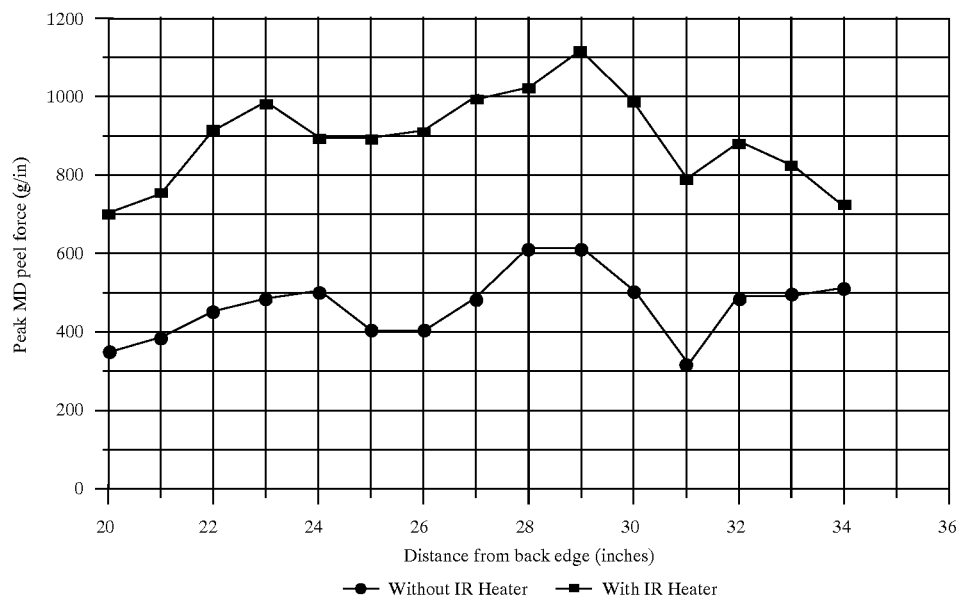

Graph 1(b)

Average Machine Direction Peel Force Across the Zone Covered By the Heater for Samples Produced with and without Infra-Red Heating

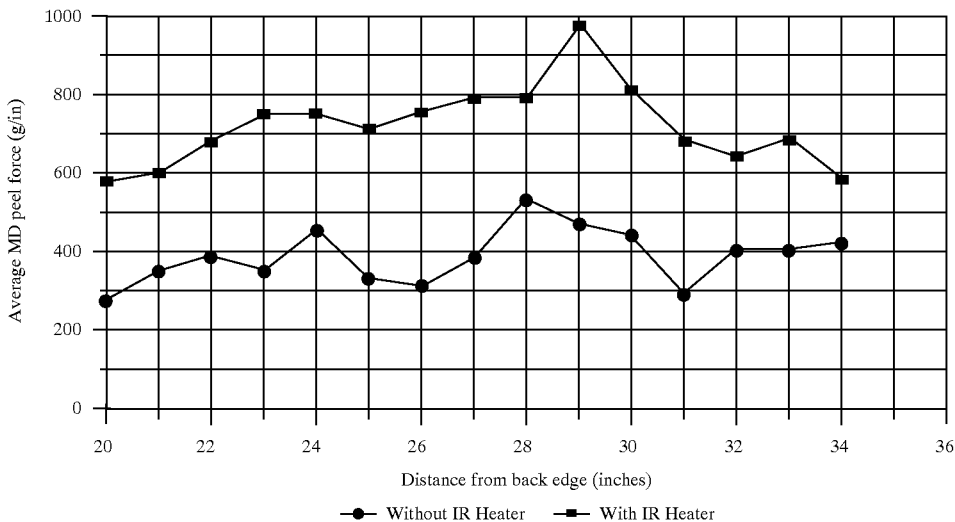

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for making a coated paperboard web comprising the steps of:

heating with infrared radiation an uncoated paperboard web to a temperature in the range of about 190 F. to about 260 F.;

extruding polyethylene terephthalate directly onto said heated paperboard web with a coat weight range between about 16 lbs./3000 ft$^2$ and about 20 lbs./3000 ft$^2$; and surface treating said coated paperboard web.

2. The method of claim 1 wherein said surface treating comprises contacting said coated paperboard web with a chill roll.

* * * * *